United States Patent [19]
Bailer et al.

[11] 4,010,380
[45] Mar. 1, 1977

[54] COMBINED LIGHT AND WINDSHIELD WIPER SWITCH

[76] Inventors: Edmund F. Bailer, 2185 NE. 123rd St. No. 104, Miami, Fla. 33181; Albert G. Makdad, 6604 Tarrega St., Coral Gables, Fla. 33146

[22] Filed: Nov. 13, 1975
[21] Appl. No.: 631,423
[52] U.S. Cl. .......................................... 307/10 LS
[51] Int. Cl.[2] ..................................... B60G 1/02
[58] Field of Search ................... 307/10 LS, 10 R; 315/77, 78, 79, 82, 83; 318/445 WW

[56] References Cited
UNITED STATES PATENTS 3,500,120  3/1970  Schultz ......................... 307/10 LS

*Primary Examiner*—Herman J. Hohauser
*Attorney, Agent, or Firm*—Jack D. Slobod

[57] ABSTRACT

A combined headlight and windshield wiper switch in an automotive vehicle includes a sliding core which may be advanced outward from an off position into three sequential active positions. Four longitudinally directed ribbon shaped contact elements are spaced angularly about a circular contact bridge carried by the core. Each contact element engages the bridge at a different number of positions. The respective contact elements, in the order of the number of positions of engagement, are connected to the auto electrical system, parking lights, headlights, and windshield wiper motor.

2 Claims, 2 Drawing Figures

U.S. Patent  Mar. 1, 1977  4,010,380
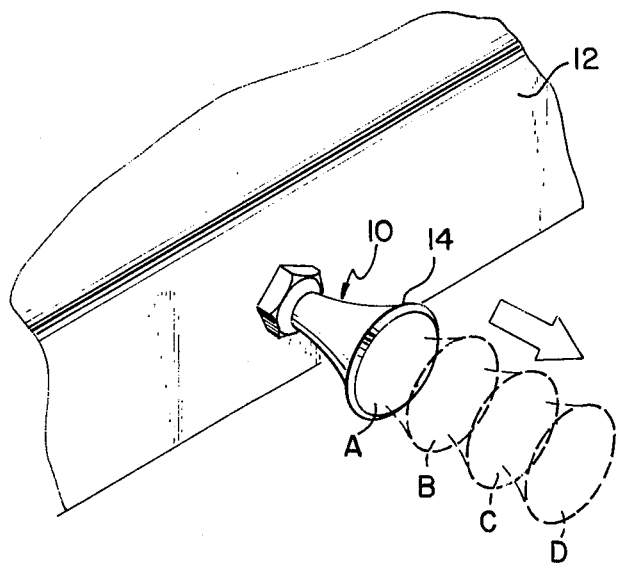
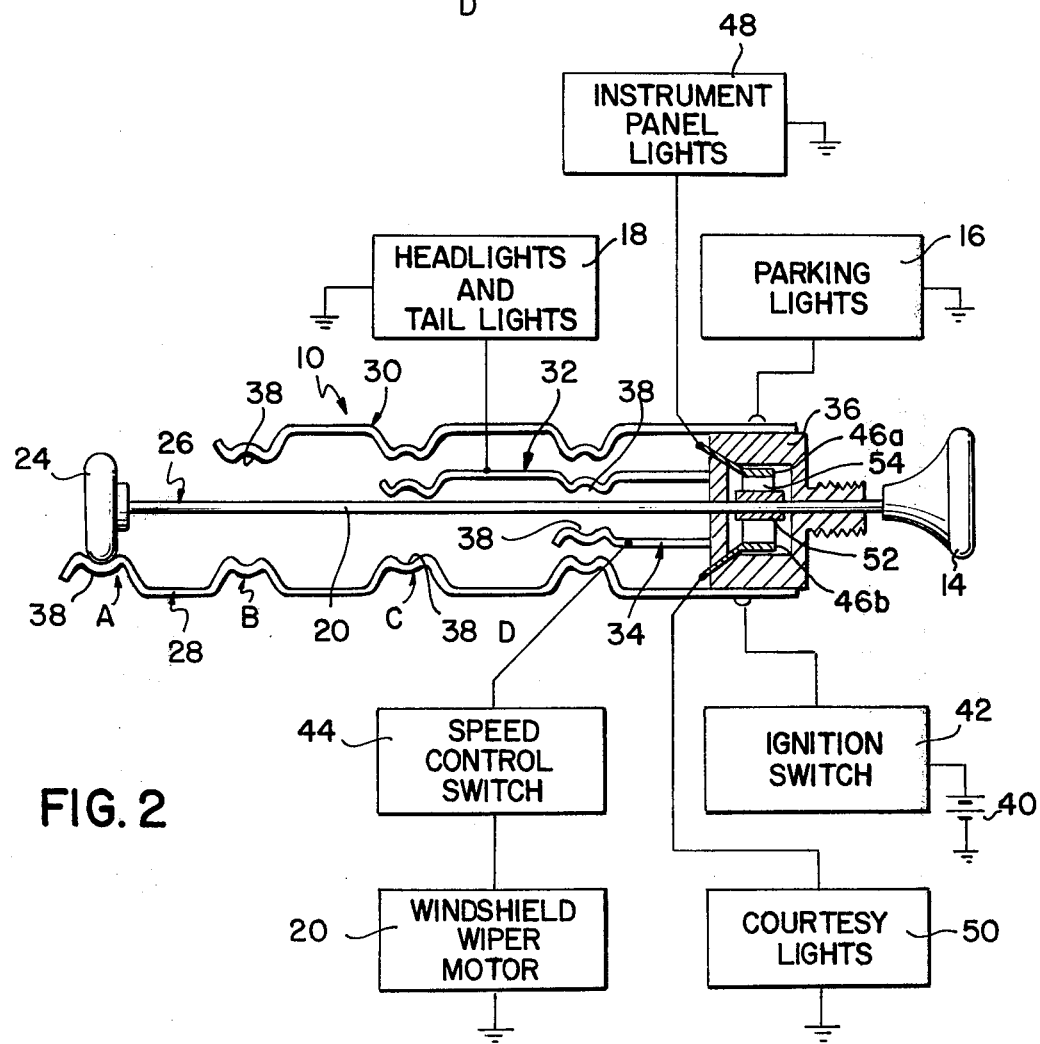

COMBINED LIGHT AND WINDSHIELD WIPER SWITCH

FIELD OF THE INVENTION

The present invention relates generally to systems for automatically turning on the headlights of an automotive vehicle when windshield wipers are turned on. In its particular aspects, the present invention relates to a multi-position switch having a first position corresponding to lights and windshield wipers being off; a second position for energizing just the parking lights; a third position for energizing the parking lights and headlights; and a fourth position for energizing the parking lights, headlights, and windshield wipers.

BACKGROUND OF THE INVENTION

Some states have promulgated traffic laws requiring the head lights and tail lights to be turned on when driving in the rain. The advantages associated with providing circuitry in an automobile for linking the windshield wiper and headlight controls, so that the headlights are turned on automatically with the windshield wipers are pointed out in the following U.S. Pats. Nos. 3,500,119; 3,519,837; 3,600,596; and 3,824,405.

The techniques utilized in these aforementioned patents for linking the windshield wiper and headlights have not been sufficiently simple to enable easy conversion of existing vehicles since they have generally involved the provision of additional circuitry associated with the usual windshield wiper switch.

OBJECTS OF THE INVENTION

It is an object of the present invention to provide a headlight switch with an auxiliary position for turning on the windshield wipers in a manner for the parking lights to be turned on in a first position, the parking lights and headlights to be turned on in a second position and the parking lights, headlights and windshield wipers to be turned on in a third position.

It is a further object of the present invention to provide a switch which has plural sequential positions and is configured to engage an additional contact in each sequential position.

SUMMARY OF THE INVENTION

Briefly the aforementioned and other objects of the present invention are satisfied by providing a switch having a slideable core which may be pulled from an off position to three sequential positions. The core carries a circular contact element which is configured to serve as a bridge between detent shaped waves in four contact strips spaced angularly about the core. A first strip, which is coupled to the automobile electrical system has four waves located at the off position and the three sequential positions of the contact element for applying power to the contact element. A second strip coupled to the parking lights has waves in each of the three sequential positions. A third strip coupled to the headlights and tail lights has waves in the last two of the three sequential positions and a third strip coupled to the windshield wiper motor has a wave in the last position.

Other objects, features and advantages of the present invention will become apparent upon perusal of the following detailed description of the preferred embodiment thereof when taken in conjunction with the appended drawing wherein:

FIG. 1 is a pictorial presentation of the front of the switch of the present invention mounted on an automobile dashboard; and FIG. 2 is a combined electrical schematic and side view of the switch in FIG. 1.

DETAILED DESCRIPTION

Referring first to FIG. 1 of the drawing the switch 10 of the present invention is shown mounted on the dashboard 12 of a motor vehicle in the position of the usual light control switch. Switch 10 is of the push-pull type and includes a knob 14 which may be pulled outward from an initial OFF positions, A to three successive position B, C and D.

Now with further reference to FIG. 2, it will be understood as the discussion proceeds that position B corresponds to energizing the parking lights 16; position C to energizing of the parking lights 16, and headlights and tail lights 18; and position D to energizing parking lights 16, headlights and tail lights 18, and windshield wiper motor 20.

To this end, the knob 14 is fixedly secured to the front end of a shaft 22 of preferably square cross-section. The rear end of shaft 22 carries a coaxial circular metal contact element 24. The knob 14, shaft 20 and contact element 24 may be thought of as a sliding core 26 for the switch, the contact element 24 being moveable to any of the positions A–D, marked on FIG. 2, in correspondence with the movement of knob 14 illustrated in FIG. 1.

Four longitudinally directed contact ribbons or strips 28, 30, 32 and 34 are angularly spaced about core 26 and are supported by a cylindrical insulator 36 at the front end of switch 10. Each of the ribbons 28-34 has detent-shaped waves 38 formed for engaging the contact element 24 at various of the positions A–D.

Strip 28 has waves 38 at each position A through D and is coupled to the vehicle electrical voltage supply system such as an auto battery 40 via the ignition switch 42 for energization of contact element 24 in each position A–D.

Strip 30 has waves 38 at positions B–D and is coupled to parking lights 16. Thus, contact element 24 bridges electrically between strips 28 and 30 in positions B–D.

Strip 32 has waves 38 at positions C and D and is coupled to headlights and tail lights 18. Thus, with contact element 24 bridging between strips 28 and 32 in positions C and D, the headlights are energized in this position.

Strip 34 has a wave 38 only at position D and is connected to windshield wiper motor 20 via a separate motor speed selector switch 44. In position D, contact element 24 bridges between strips 28 and 38 to energize windshield wiper motor 20 via speed selector switch 44. The combination of motor 20 and switch 44 may be defined as a windshield wiper means that is energized in position D.

Preferably, the insulator 36 contains the split rheostat ring 46 of resistive material having opposite semicircular sectors 46a and 46b connected to the instrument panel lights 48 and courtesy lights 50. The square shaft 20 passes through a square bore in a bushing 52 carrying a wiper 54 acting against the interior surface of ring 46. The wiper 54 rotates when knob 14 is rotated and is energized via the contact between element 24 and ribbon 28 and via the metal shaft 20.

Rotation of knob 14 selectively energizes and adjusts the intensity of instrument panel lights 48 and courtesy lights 50.

While the preferred embodiment of the present invention has been described in specific detail, it should be understood that numerous modifications, additions and omissions in the details thereof are possible within the intended spirit and scope of the invention claimed herein.

What is claimed is:

1. In a vehicle having headlights, parking lights, a windshield wiper motor and an electrical supply system, a combined light and windshield wiper control apparatus comprising a switch having a sliding core carrying a generally circular contact element positionable in at least three discrete positions, means for coupling said contact element to said electrical system in each of said three positions, three elongated conductive strips spaced angularly about said core, said strips carrying contact means for engaging said contact element, a first of strips being coupled to said parking lights, the contact means of said first strip being located for engaging said contact element in each of said three position, a second of said strips being coupled to said headlights, the contact means of said second strip being located for engaging said contact element in two of said three positions, a third of said strips being coupled to said windshield wiper motor, the contact means of said third strip being located for engaging said contact element in one of the two contact means positions associated with said second strip.

2. In a vehicle having headlights, parking lights, a windshield wiper means and an electrical voltage supply system, a combined light and windshield wiper control apparatus comprising: a single selector switch having at least three successive portions, said switch including: first contact means for coupling said electrical system to said parking lights in a first of said successive positions of said switch, second contact means for coupling said electrical system to said parking lights and said headlights in a second of said successive positions of said switch, and third contact means for connecting said electrical system to said parking lights, headlights and windshield wiper means in a third of said successive positions of said switch.

* * * * *